(12) United States Patent
Frank et al.

(10) Patent No.: US 6,488,059 B2
(45) Date of Patent: Dec. 3, 2002

(54) DOCKING ASSEMBLY OF A PRESSURIZED-GAS CANISTER ASSEMBLY WITH A MANIFOLD ASSEMBLY

(75) Inventors: Kenneth Frank, Kearney, NE (US); James Morrow, Oak Park, IL (US)

(73) Assignee: Coleman Powermate, Inc., Kearney, NE (US)

(*) Notice: Subject to any disclaimer, the term of this patent is extended or adjusted under 35 U.S.C. 154(b) by 0 days.

(21) Appl. No.: 09/992,494

(22) Filed: Nov. 14, 2001

(65) Prior Publication Data

US 2002/0060227 A1 May 23, 2002

Related U.S. Application Data

(62) Division of application No. 09/614,642, filed on Jul. 12, 2000, now Pat. No. 6,360,914.

(51) Int. Cl.[7] .................................................. B65B 1/04
(52) U.S. Cl. ........................ 141/351; 141/301; 141/383; 137/614.03; 137/614.04
(58) Field of Search ................................. 141/351, 383, 141/386, 3, 20, 301, 302; 222/465.1, 469, 470, 472–474, 195, 182, 3; 137/614.03, 614.04

(56) References Cited

U.S. PATENT DOCUMENTS

| 4,458,719 A | * | 7/1984 | Strybel | .................. | 137/614.03 |
| 5,150,880 A | * | 9/1992 | Austin et al. | .......... | 137/614.05 |
| 5,694,991 A | * | 12/1997 | Harris et al. | ........... | 137/614.03 |
| 6,062,606 A | * | 5/2000 | Carpini et al. | ............... | 285/316 |

\* cited by examiner

*Primary Examiner*—Steven O. Douglas
(74) *Attorney, Agent, or Firm*—Leydig, Voit & Mayer, Ltd.

(57) ABSTRACT

A canister assembly includes a canister, a plug enclosure, a vent mechanism, a delivery valve mechanism, and a protective handle. The plug enclosure may be attached to the canister at an opening and forms a pressurized seal of the interior cavity of the canister. The vent mechanism automatically reduces pressure when pressure inside the canister exceeds a preset level. The delivery valve mechanism can be automatically and remotely activated subject to a user's control to provide gaseous flow from the canister. The protective handle is fastened to the canister and includes the handle docking element. A docking assembly includes a canister assembly, a manifold assembly, a docking station, and a docking mechanism. The docking mechanism includes a handle docking element and a port docking element. The manifold assembly includes a manifold and at least one port attached to the manifold. The docking station includes a canister bay, protective housing, and the port docking element.

10 Claims, 15 Drawing Sheets

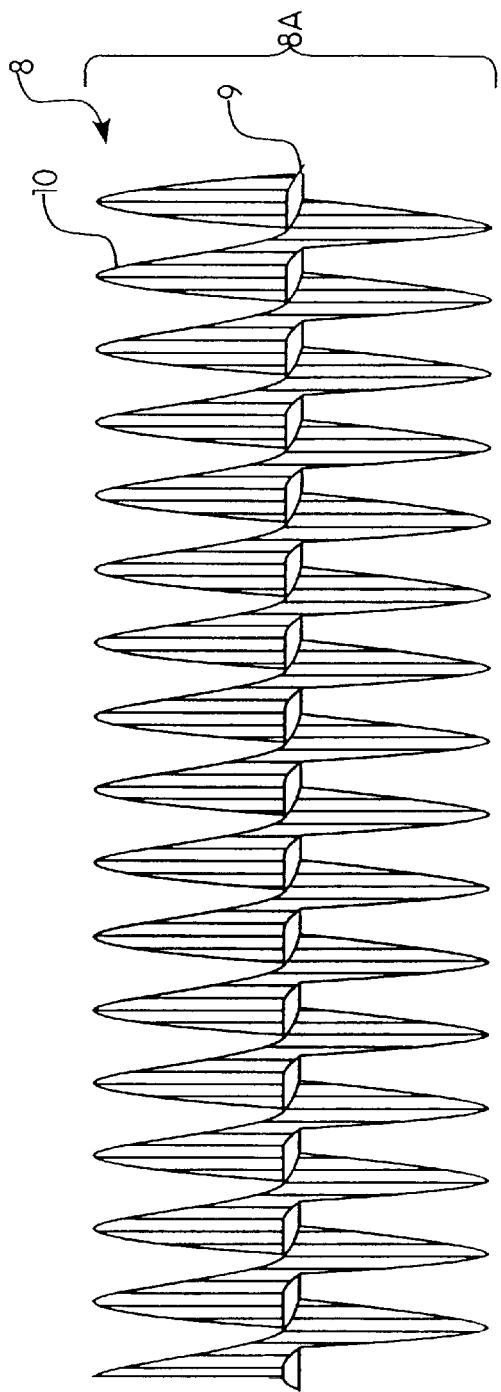
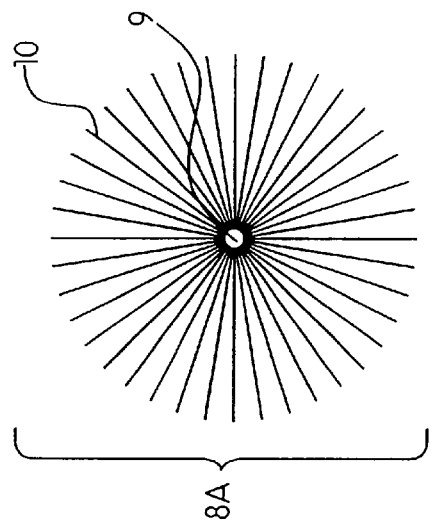
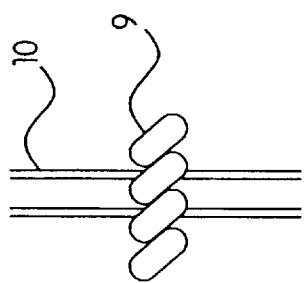
FIG. 3A
FIG. 3B
FIG. 3C

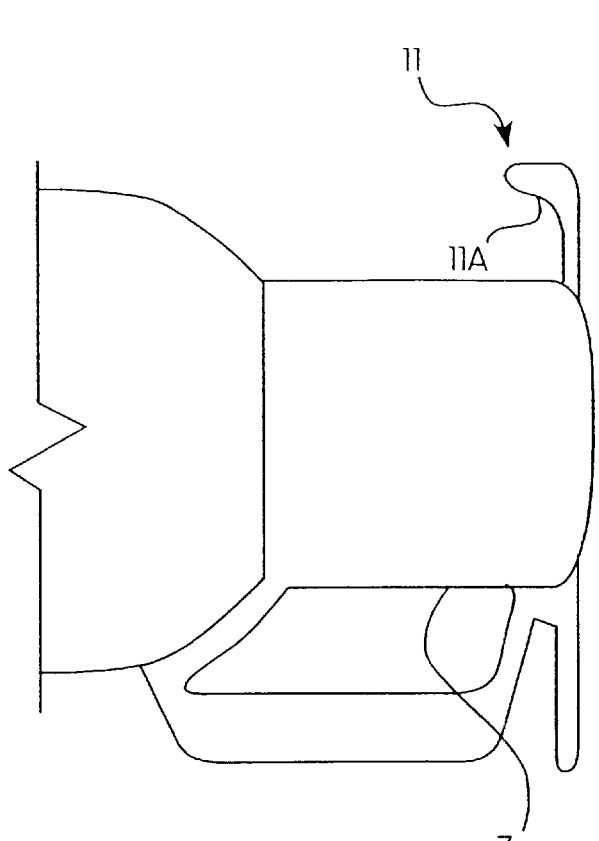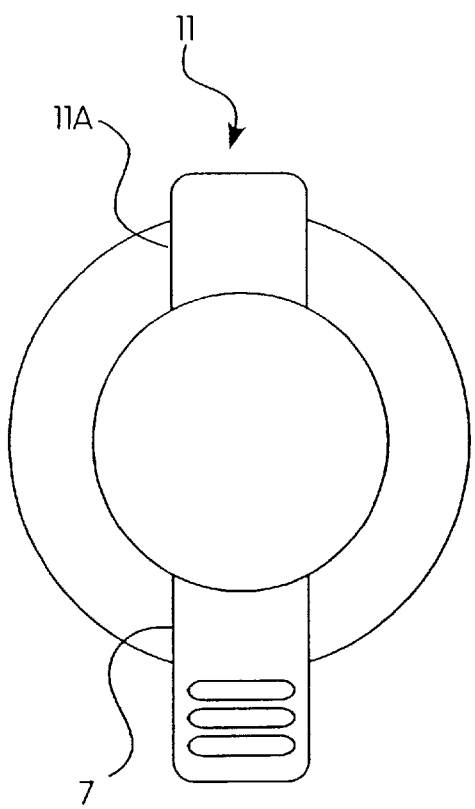
FIG. 4A    FIG. 4B
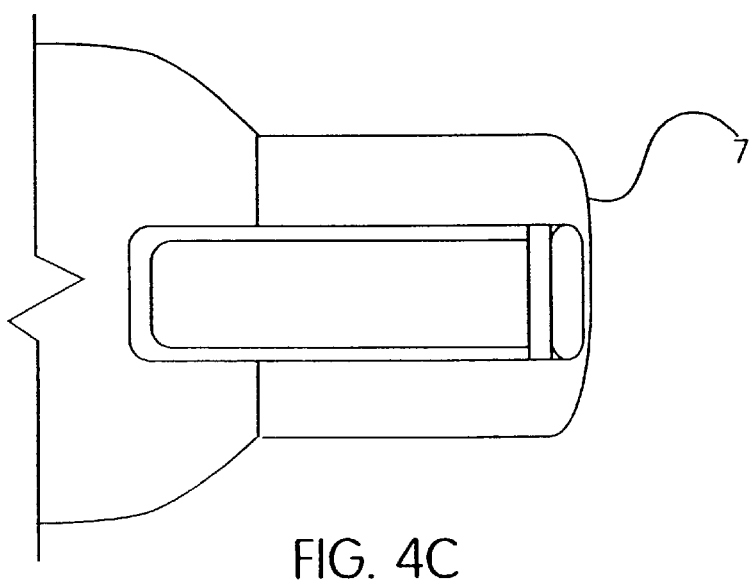
FIG. 4C

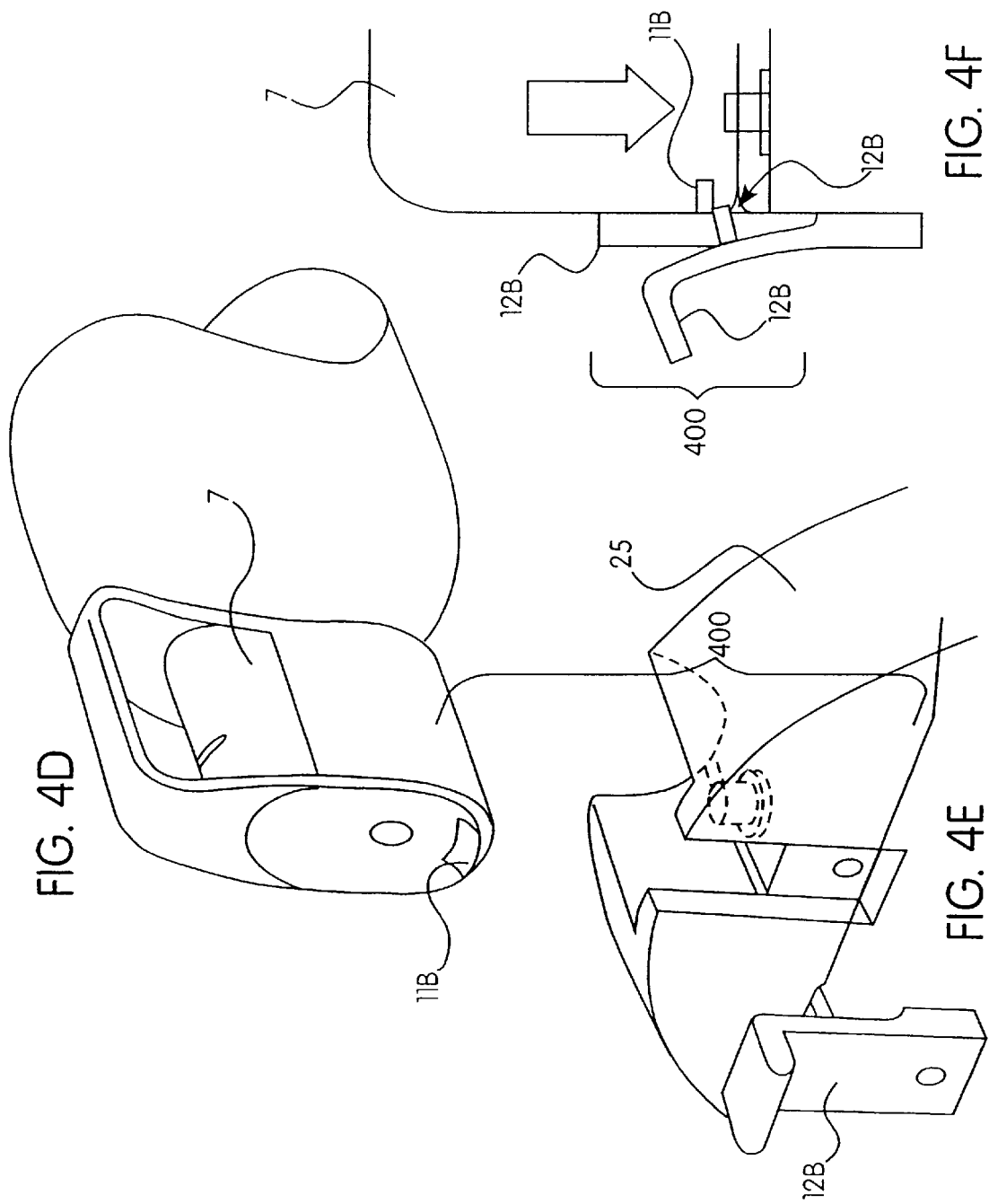

DOCKING ASSEMBLY OF A PRESSURIZED-GAS CANISTER ASSEMBLY WITH A MANIFOLD ASSEMBLY

RELATED APPLICATION

The present application is a divisional application of U.S. patent application Ser. No. 09/614,642, filed Jul. 12, 2000 now U.S. Pat. No. 6,360,914 and entitled DOCKING ASSEMBLY OF A PRESSURIZED-GAS CANISTER ASSEMBLY WITH A MANIFOLD ASSEMBLY.

FIELD OF THE INVENTION

The present invention relates to pressurized-gas canister assemblies, and more specifically to metal hydride canister assemblies.

BACKGROUND INFORMATION

Canisters containing pressurized-gas are well-known in the art. Enclosures sealing such canisters are also well known in the art. Canister enclosures are frequently designed to permit a canister to be easily filled, emptied, and refilled. Pressurized-gas canisters frequently are hollow, cylindrical shells made in accordance with, for example, U.S. Department of Transportation (DOT) specifications, such as DOT 3AL. At one or both ends of the cylinder, enclosures seal the canister to maintain internal pressure and facilitate transfer of gas into and out of the canister. Depending on the function of the canister, the enclosure may include a resealable valve through which the canister is filled, emptied, and refilled. Typically a regulator or control valve attaches to, or is part of, the resealable valve on the canister.

Metal hydride canisters differ from typical high-pressure gas canisters in that the metal hydride disassociates within the canister into hydrogen gas and the metal ion, and the metal ion remains in the canister after the hydrogen gas is removed. The metal ion may be re-hydridized as a way to recharge the canister for future use. In comparison to gaseous hydrogen and liquid hydrogen storage, the advantages of metal hydride storage of hydrogen include the high volumetric density of hydrogen in the metal hydride, the ability to operate and store the metal hydride canisters at ambient temperature and pressure, and improved safety features.

SUMMARY OF THE INVENTION

The present invention is directed to pressurized-gas canister assemblies and to docking assemblies of pressurized-gas canister assemblies with manifold assemblies. A docking assembly may include a pressurized-gas canister assembly, a manifold assembly, a docking station, and a docking mechanism. A pressurized-gas canister assembly includes, for example, a canister, a plug enclosure, a heat transfer/decrepitation device, and a protective handle. The canister may be a light-weight, metal container having a narrow opening suitable for enclosure. The plug enclosure may be a hard, durable attachment appropriately sized to provide a tight seal with the opening of the canister capable of withstanding the internal pressure of the canister once pressurized. The plug enclosure may include a vent mechanism, for example, a pressure relief valve, a rupture disk, a fusible plug, or a combination of similar such devices. The plug enclosure also may include a delivery valve mechanism through which pressurized-gas is removed or added to the canister without unintentionally depressurizing the canister. The delivery valve mechanism permits the controlled delivery of gas into or out of canister, whereas the vent mechanism vents gas when the internal pressure of the canister exceeds a prescribed pressure.

The heat transfer/decrepitation device may reside inside the canister, conducting heat inward from the exterior shell of the canister towards the center of the canister. In addition, it also resists compaction and promotes decrepitation of the hydride alloy. The protective handle may envelop the plug enclosure and attach to the canister assembly for convenience. The protective handle provides a means for carrying the canister assembly, protects the plug enclosure, and facilitates the interconnection of the delivery valve mechanism of the plug enclosure with the valve interface of a manifold.

In an embodiment of the present invention, the pressurized-gas canisters include metal hydride/hydrogen storage containers for use in, for example, hydrogen fuel cell generators. The products within this family will vary depending on their intended use, fuel storage capability and potential power output capability. In an exemplary embodiment of the present invention, the pressurized-gas canisters are intended to store metal hydride and supply hydrogen to a fuel cell module, wherein one metal hydride canister will produce 1 kW of A.C. electric power for a one hour period of time from a hydrogen-driven fuel cell module.

In another exemplary embodiment, the canister/manifold docking assembly could operate within a seamless, uninterrupted power source such as a fuel cell generator. For example, when such a generator is plugged into the grid supplied power, A.C. power would be supplied from the grid through the internal control system of the unit to the load. The on-board power source could be maintained in a standby mode until power is lost from the grid. The on-board control system could sense the loss of grid power and switch the load to backup power within, for example, ½ cycle of the 60 Hz waveform. A microprocessor-based control system would supervise the entire operation of the unit and communicate with the microprocessor in the D.C. fuel cell module to maintain proper operation of the unit. The fuel cell module could include all the necessary components (e.g., fuel cell stacks, air compressor, gas sensors, pressure regulators, etc.) to generate electricity from hydrogen. The initial energy to supply power to the load and controls could be derived from on-board batteries. When the load is switched to the standby power source, the control electronics also would activate the fuel cell D.C. power module. When the fuel cell module has completed its start-up sequence and is ready to supply power, it could share the energy burden with the batteries and also supply additional energy to recharge the batteries. Once the fuel cell module is supplying electrical energy, battery energy would only be required for surge loads in excess of the rated 1 kW capability of the unit. These surge loads would be those that might be expected when starting an electric motor.

BRIEF DESCRIPTION OF THE DRAWINGS

FIGS. 3A–3C show a heat transfer/decrepitation device according to an exemplary embodiment;

DETAILED DESCRIPTION

Figure 1:
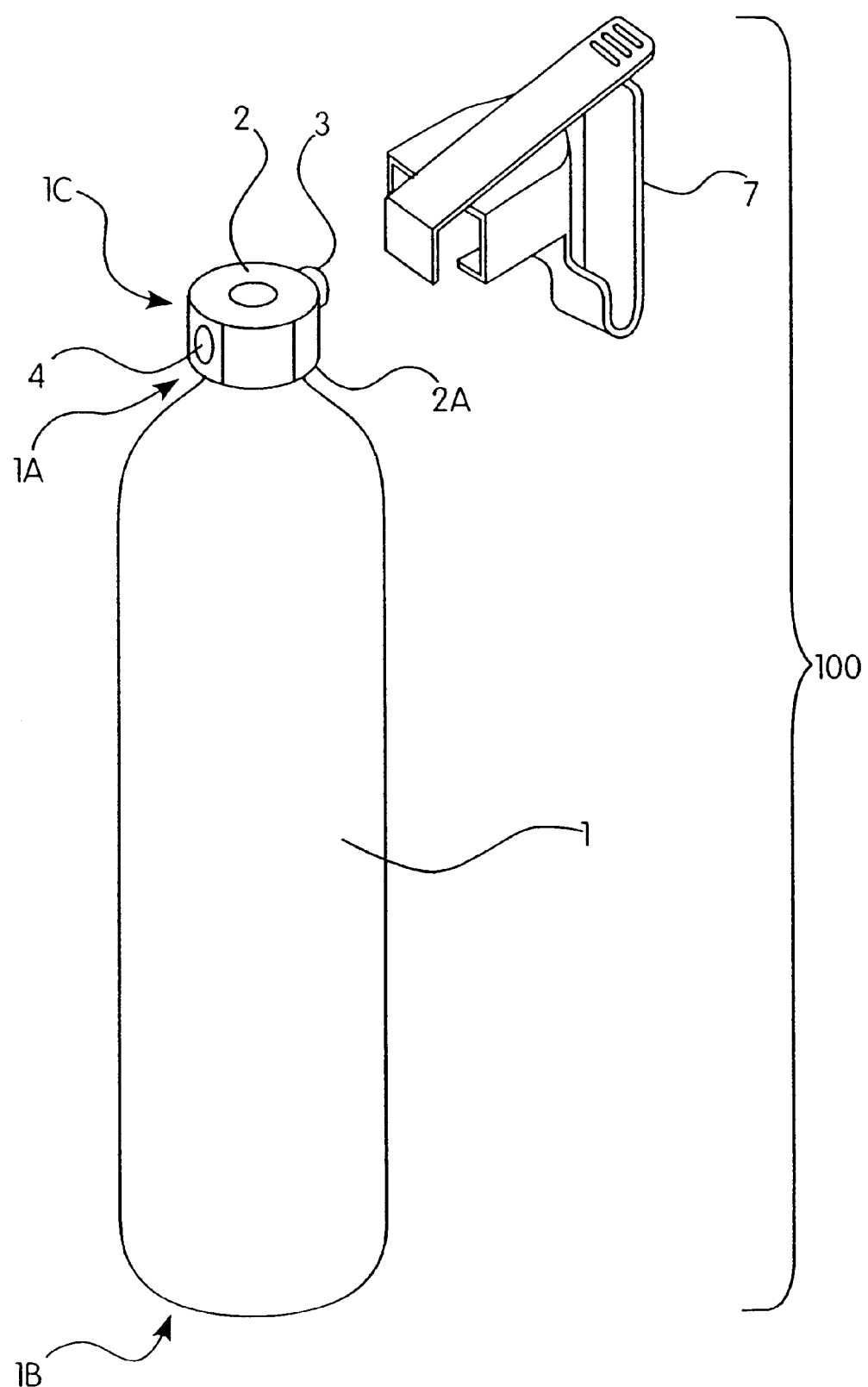
FIG. 1 shows a canister assembly according to an exemplary embodiment.

Beginning with FIG. 1, a canister assembly 100 is shown according to an exemplary embodiment. Canister assembly 100 shown is one configuration of several possible designs. Canister assembly 100 may include, for example, a canister 1, a plug enclosure 2, a vent mechanism 3, a delivery valve mechanism 4, a protective handle 7, and a heat transfer/decrepitation device 8 (shown in FIGS. 3A–3C). Canister 1 may be, for example, an aluminum cylinder, designed to comply with DOT 3AL regulations. Canister 1 includes a top 1A and a bottom 1B with As an opening 1C at top 1A. The metal hydride formulation (not shown) contained inside canister 1 may be one of many different types, including among others the AB, AB2, and AB5 hydride families which are designed to operate in standard atmospheric conditions with various operating parameters, such as hydrogen storage capacity.

In FIG. 1, plug enclosure 2 may be fastened to canister 1 at opening 1C of canister 1. Attachment mechanism 2A may fasten plug enclosure 2 to canister 1. For example, attachment mechanism 2A may be threads on plug 2 that fit in grooves in opening 1C whereby plug enclosure 2 may be screwed into opening 1C of hydride canister 1. An o-ring seal (not shown) may be used to prevent leaks at the canister/plug interface. Plug enclosure 2 also may include a vent mechanism 3. Vent mechanism 3 may automatically activate and relieve internal pressure inside the canister if internal pressure exceeds a predetermined level. Examples of vent mechanism 3 include, for example, a pressure relief valve, a rupture disk, a fusible plug, or a combination of similar such devices to comply with Compressed Gas Association Standards.

Figure 6:
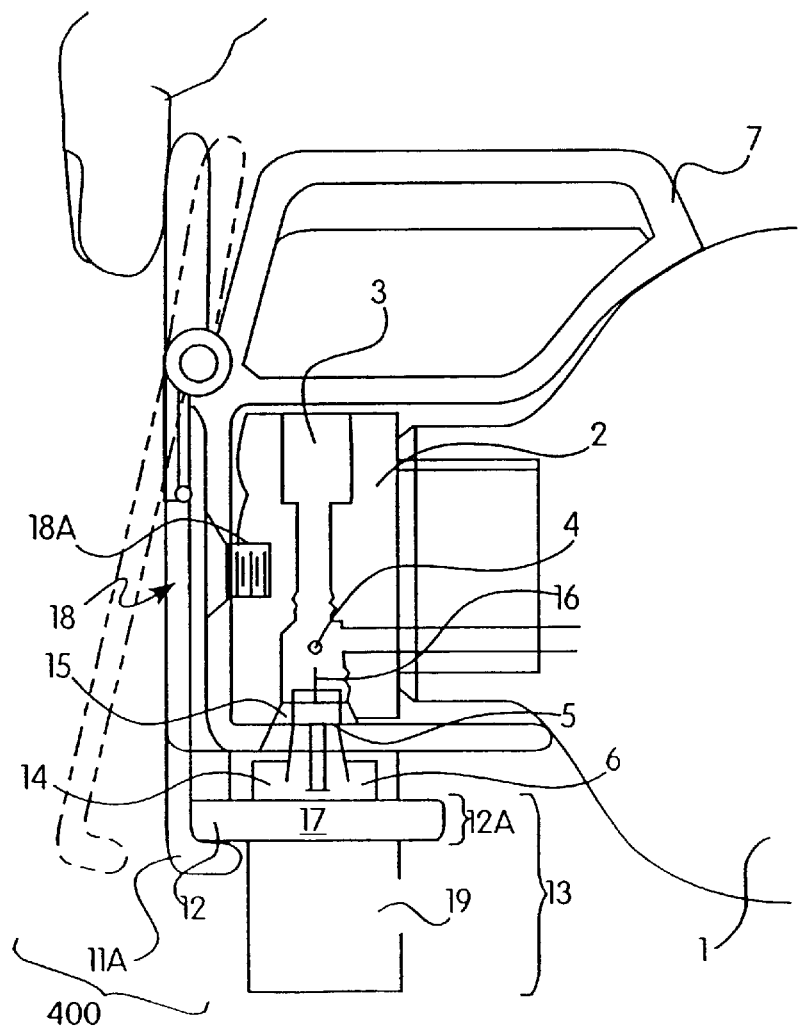
FIG. 6 shows a cut-away view of a canister assembly according to an exemplary embodiment.

The exemplary embodiment of FIG. 1 also shows a female delivery valve mechanism 4 that is recessed, for example, inside plug enclosure 2. Delivery valve mechanism 4 may be a mechanically-activated valve that acts as the main interconnection between canister 1 and a port 19 of a manifold 13 as shown in FIG. 6. An exemplary embodiment of delivery valve mechanism 4 may be the commercially-available valve known widely as a "Schrader" valve, manufactured by Schrader-Bridgeport, Inc. A male fitting 14 on manifold port 19, shown in FIG. 7A with an o-ring seal 5, may be designed to slip into the recessed bore of female delivery valve mechanism 4 within plug 2 and provide a sealed interface. When, for example, solenoid 6 on manifold port 19 is activated, plunger 15 of solenoid 6 may push on valve pin 16 of delivery valve 4 in plug 2, thereby opening valve 4. This allows, for example, hydrogen in the canister to flow through delivery valve 4 and plunger 15 into manifold 13.

Figure 2:
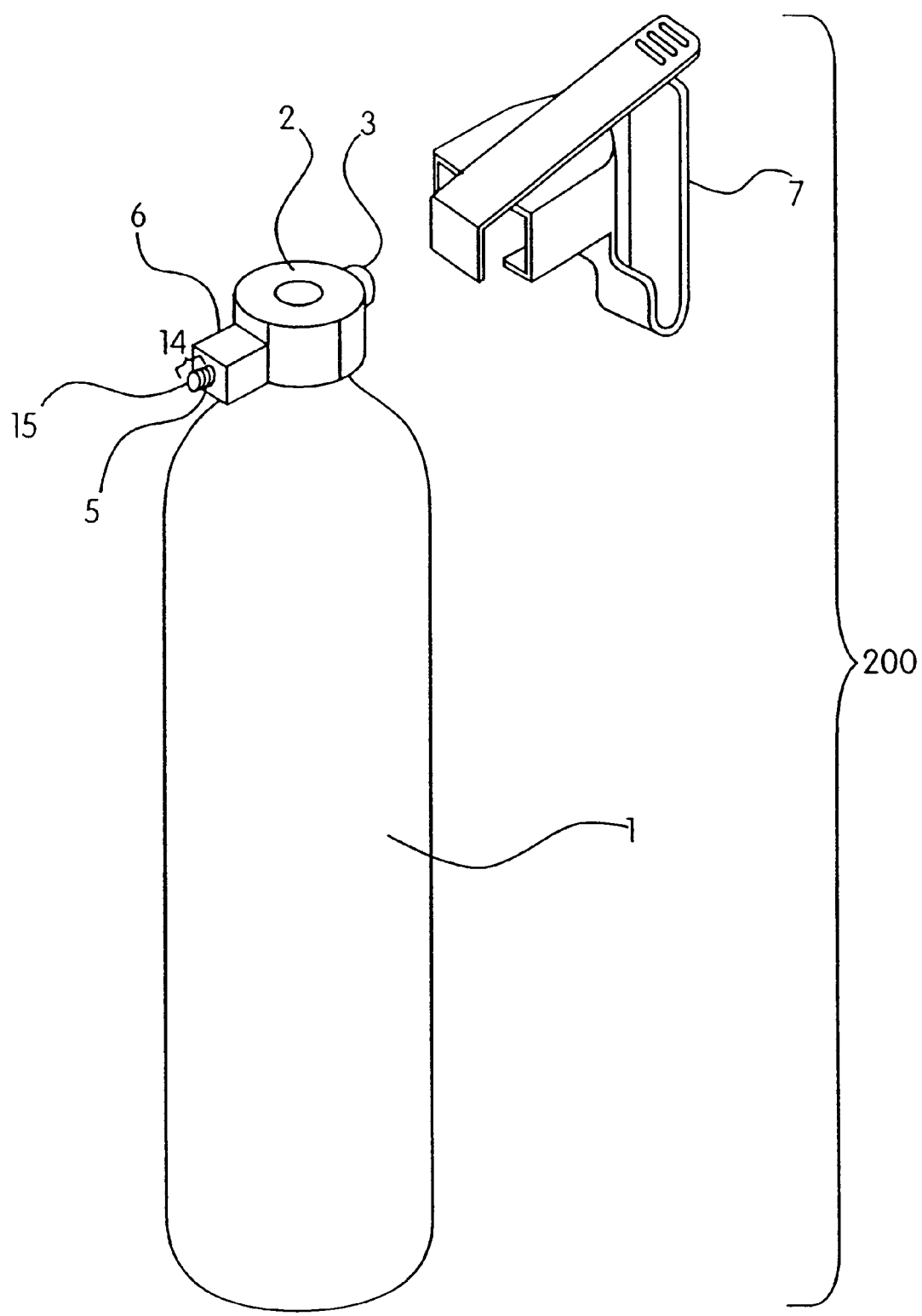
FIG. 2 shows a canister assembly according to another exemplary embodiment.
Figure 7A:
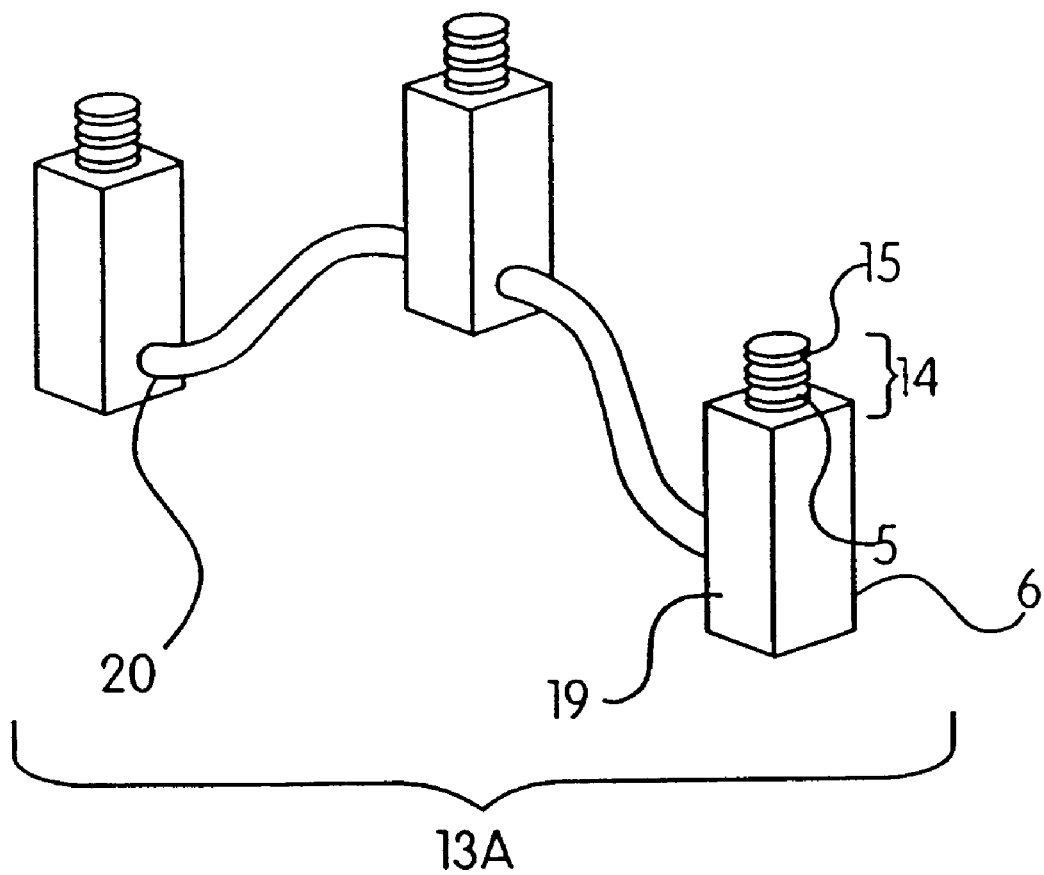
FIGS. 7A–7B show two manifold assemblies according to exemplary embodiments.

FIG. 2 illustrates a canister assembly 200 according to an exemplary embodiment in which solenoid valve 6 has been placed on plug enclosure 2 instead of on manifold port 19. In this embodiment, plunger 15 of male fitting 14 of solenoid valve 6 may interface with manifold port 21 shown in FIG. 7B. O-ring seal 5 on male fitting 14 would provide a tight seal with manifold port 21. Manifold port 21 may include, for example, a recessed manifold inlet 22 having an electrical connection 23 that connects to solenoid valve 6 and activates plunger 15. As shown in FIG. 7A, a check valve 20 may also be present to prevent the back flow of gas.

The valve arrangements of FIGS. 1 and 2 would provide a redundant fuel shut-off system. Hydrogen gas would be prevented from entering manifold port 19, 21, or leaving canister 1 unless an electronic control device (not shown) has activated delivery valve mechanism 4. Gas could not flow backwards out of manifold port 19, 21 due to the action of a check valve 20 (shown in FIG. 7A). Likewise, gas could not enter manifold port 19, 21 unless a canister 1 is properly placed in connection to manifold port 19, 21. Solenoid valve 6 should be properly aligned and activated by control electronics (not shown) to cause canister 1 to release hydrogen. If a system fault is detected, solenoid valve 6 may be deactivated at each canister 1, shutting off the flow of fuel. By using solenoid valve 6, delivery valve mechanism 4 may be automatically and remotely controlled by control electronics connected to solenoid valve 6.

FIGS. 3A–3C show an exemplary embodiment of a heat transfer/decrepitation device 8 contained inside canister 1, along with the metal hydride, to aid in heat transfer from the walls of the cylinder to the hydride bed. Temperature equalization is important to metal hydride canister usage because the metal hydride cools down as hydrogen is released. The release of the hydrogen is an endothermic reaction which rapidly cools the interior of canister 1. The metal hydride is a poor thermal conductor resulting in a thermal gradient from the center of canister 1 to the walls of canister 1. Efficient release of the hydrogen from the metal hydride requires equalization of the metal hydride temperature.

In this example, heat transfer/decrepitation device 8 may include, for example, a brush 8A having a stem 9 with bristles 10 made of a material with good heat transfer characteristics. Brush 8A also aids in reducing compaction of the hydride powder. Other means can also be used to produce the same results as brush 8A. Brush 8A could be designed so that it may bend as it is inserted into canister 1 through opening 1C and spring back to its initial shape once past opening 1C. Bristles 10 should contact the inside of canister 1 when brush 8A is inside canister 1. An example of brush 8A would have bristles 10 made of an aluminum alloy or of brass, crafted into the stiffest and finest wire possible. Stem 9 may be made, for example, of an aluminum wire having the smallest possible diameter. Brush 8A may be constructed, for example, by twisting stem 9 into a single-wire spiral around bristles 10, as shown in FIG. 3C, so as to include as many bristles 10 per inch along stem 9 as possible.

FIGS. 1 and 2 also depict protective handle 7, which fits over plug enclosure 2. Protective handle 7 may, for example, envelope plug enclosure 2 and attach to the canister assembly 100, 200. Protective handle 7 may also shield the vent mechanism 3 and provide a handle with which to grasp canister 1. Protective handle 7 may be attached to the canister assembly 100, 200 via fastening device 18 to act as a carrying device for individual canister assembly 100, 200 and as a protection device for the interconnection between manifold port 19 and plug 2, protecting it from physical damage.

As seen in FIGS. 4A–4C, protective handle 7 may include a handle docking element 11 to releasably mate with a port docking element 12 above manifold 13. FIG. 6 shows an exemplary embodiment of plug enclosure 2 and a docking mechanism 400. Handle docking element 11 may be, for example, a clip 11A and port docking element 12 may be, for example, a lip 12A, wherein clip 11A grips the lip 12A, thereby holding protective handle 7 in place relative to port 19. Alternatively, variations of a clip mechanism are shown in FIGS. 4J–4M.

In FIGS. 4D–4F, an exemplary embodiment of docking mechanism 400 is shown as a barbed latch mechanism. Handle docking element 11 may be, for example, a barb slot 11B and port docking element 12 may be, for example, a barbed latch 12B. Barbed latch 12B may have a barb projecting at an angle, allowing for hands-free operation of docking mechanism 400. As the barb fills barb slot 11B, barbed latch 12B flexes to an upright position, thereby holding protective handle 7 in place relative to port 19.

Figure 4G:
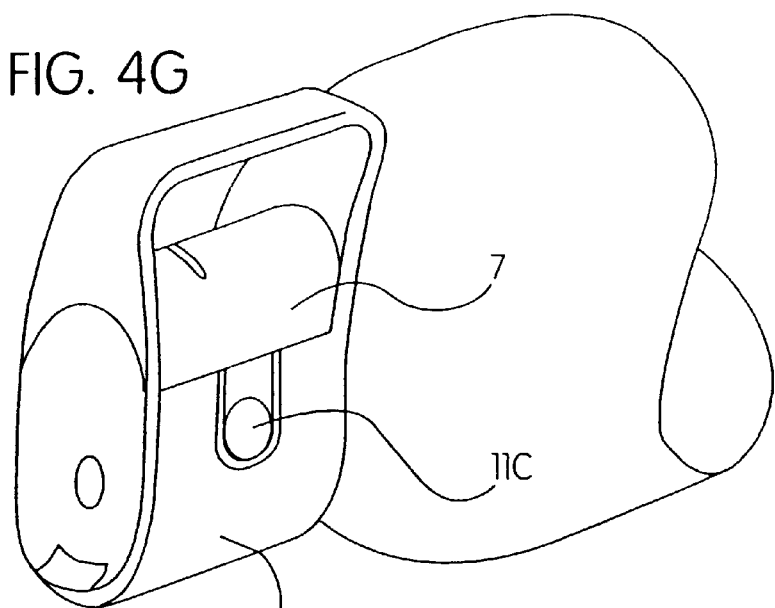
FIGS. 4A–4N show a protective handle according to exemplary embodiments.
Figure 4H:
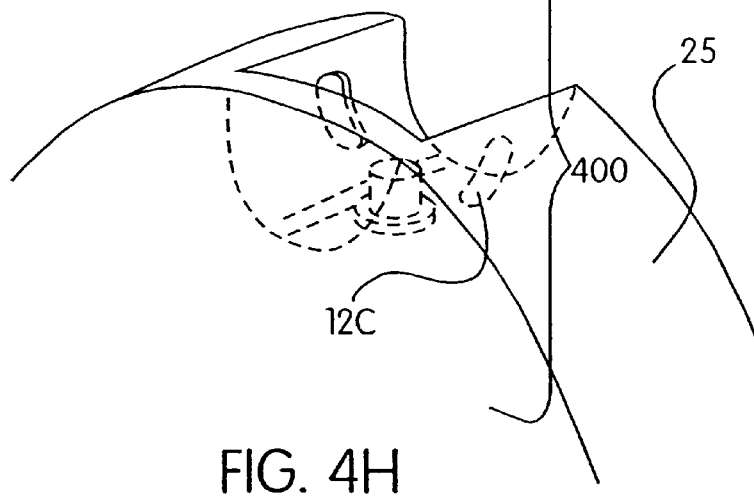
Figure 4I:
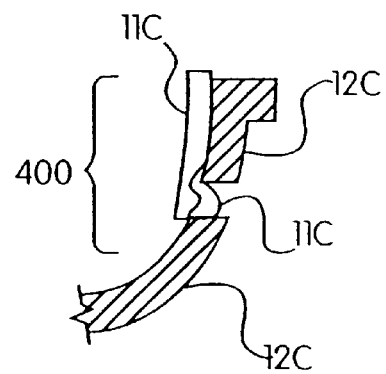
Figure 4J:
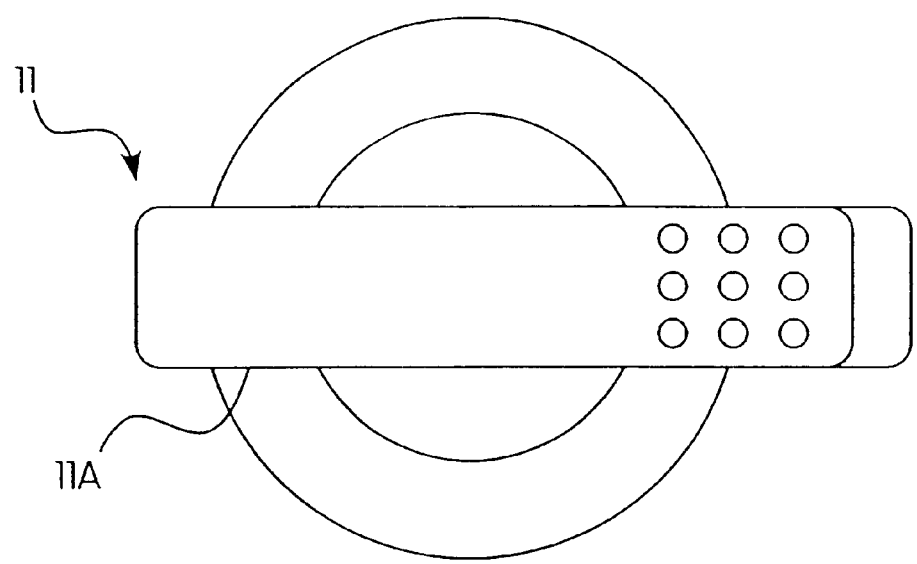
Figure 4K:
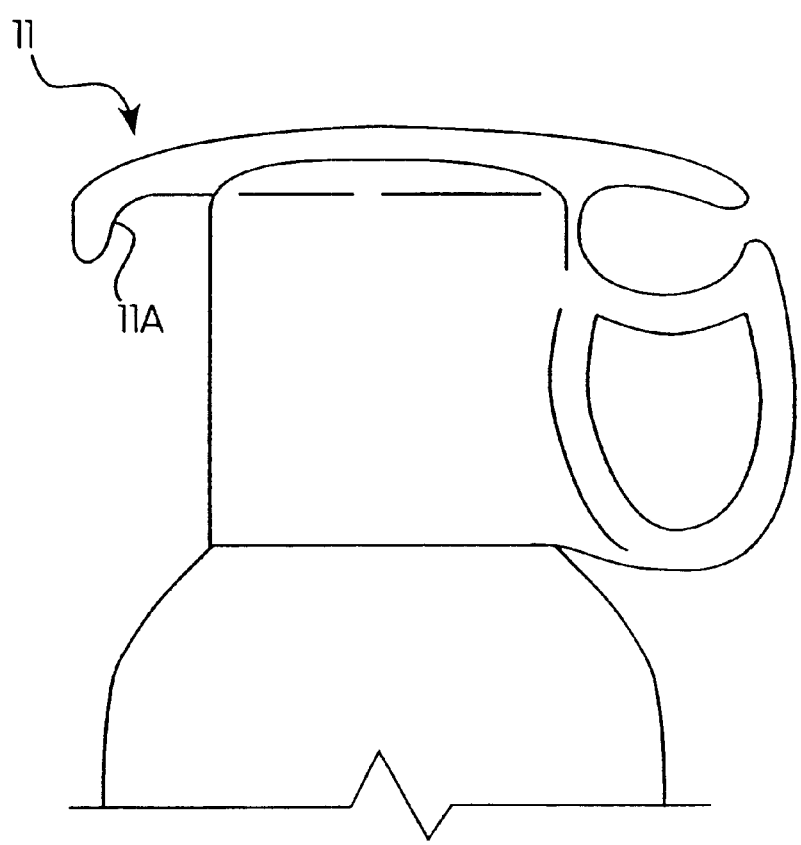
Figure 4L:
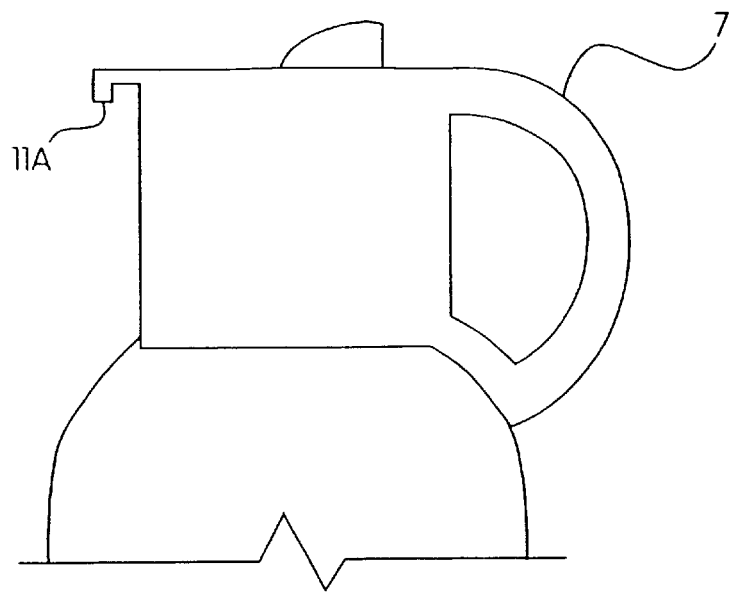
Figure 4M:
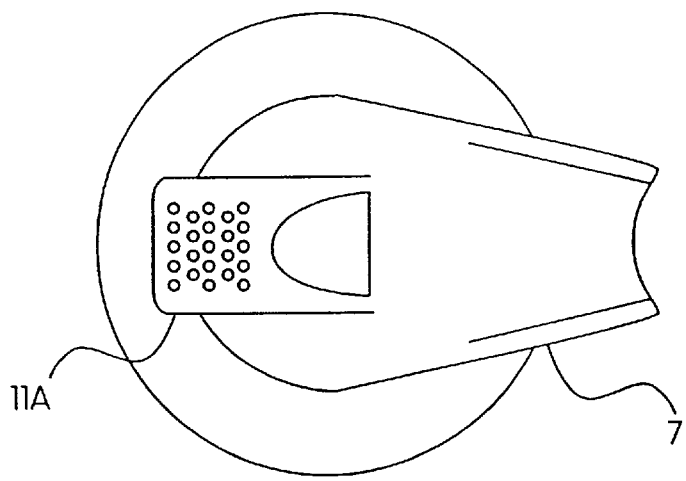
Figure 4N:
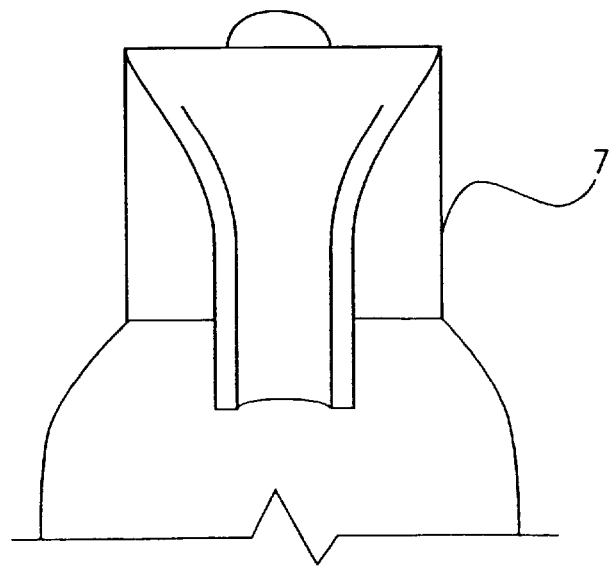

In FIGS. 4G–4I, another exemplary embodiment of docking mechanism 400 is shown as a snap mechanism. Handle docking element 11 may be, for example, a snap 11C having a flexible tooth with a rounded tip, and port docking element 12 may be, for example, a curved hole 12C. The flexible tooth forces the rounded tip of snap 11C into curved hole 12C as the rounded tip slides over curved hole 12C, thereby holding protective handle 7 in place relative to port 19.

Figure 5:
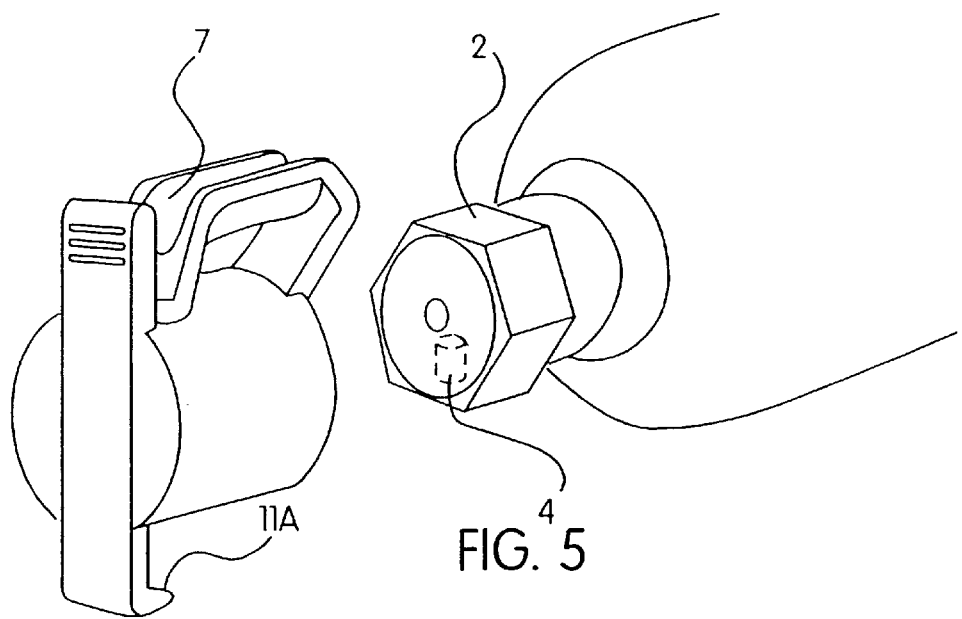
FIG. 5 shows an exploded view of a canister assembly according to an exemplary embodiment.

FIGS. 5 and 6 show how protective handle 7 may fit over plug enclosure 2 and may be fastened via fastening device 18 to plug enclosure 2. Protective handle 7 may be screwed using, for example, screw 18A into plug 2 for stability. FIG. 6 shows how operating clip 11A may engage lip 12A, which in this case is underside 17 of manifold port 19, securing canister 1 in place relative to port 19 of manifold 13.

FIG. 7A illustrates a manifold assembly 13A according to an exemplary embodiment corresponding to canister assembly 100 of FIG. 1. The illustrated manifold assembly 13A collects the hydrogen from three hydride canisters and channels it to the inlet solenoid valve of, for example, a fuel cell D.C. module (not shown). Each port 19 of manifold 13A may contain an electrically-operated solenoid valve 6, controlled by a system microprocessor (not shown), to provide individual shut-off capability for each hydride canister 1. In addition, each port 19 of manifold 13A may contain a check valve 20 to prevent back flow of hydrogen in the event that one canister is removed from the system.

Figure 7B:
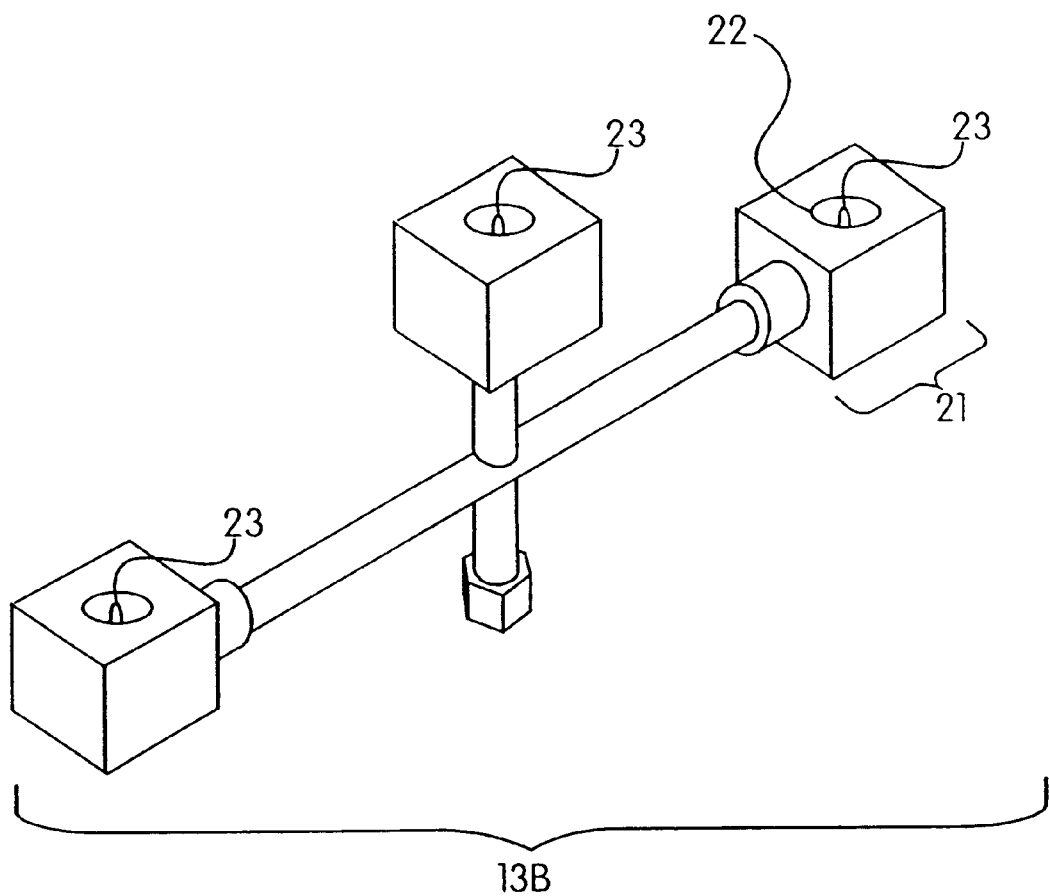

FIG. 7B illustrates a manifold assembly 13B according to an exemplary embodiment corresponding to canister assembly 200 of FIG. 2. FIG. 7B differs from FIG. 7A in that solenoid valve 6 may be placed on plug enclosure 2 instead of on manifold port 19. As a result, manifold port 21 has a recessed manifold inlet 22 having an electrical connection 23 that connects to solenoid valve 6 and activates plunger 15 of male fitting 14 of solenoid valve 6. In this design, the mechanically-operated delivery valve 4 in plug 2 may be eliminated and the electrically-operated solenoid 6 may be made a part of canister assembly 200. A male fitting 14 having an o-ring seal 5 would, for example, pilot into a manifold inlet 22. Check valve 20, as previously described, may still be present in the manifold 13B to prevent the back flow of hydrogen.

Figure 8A:
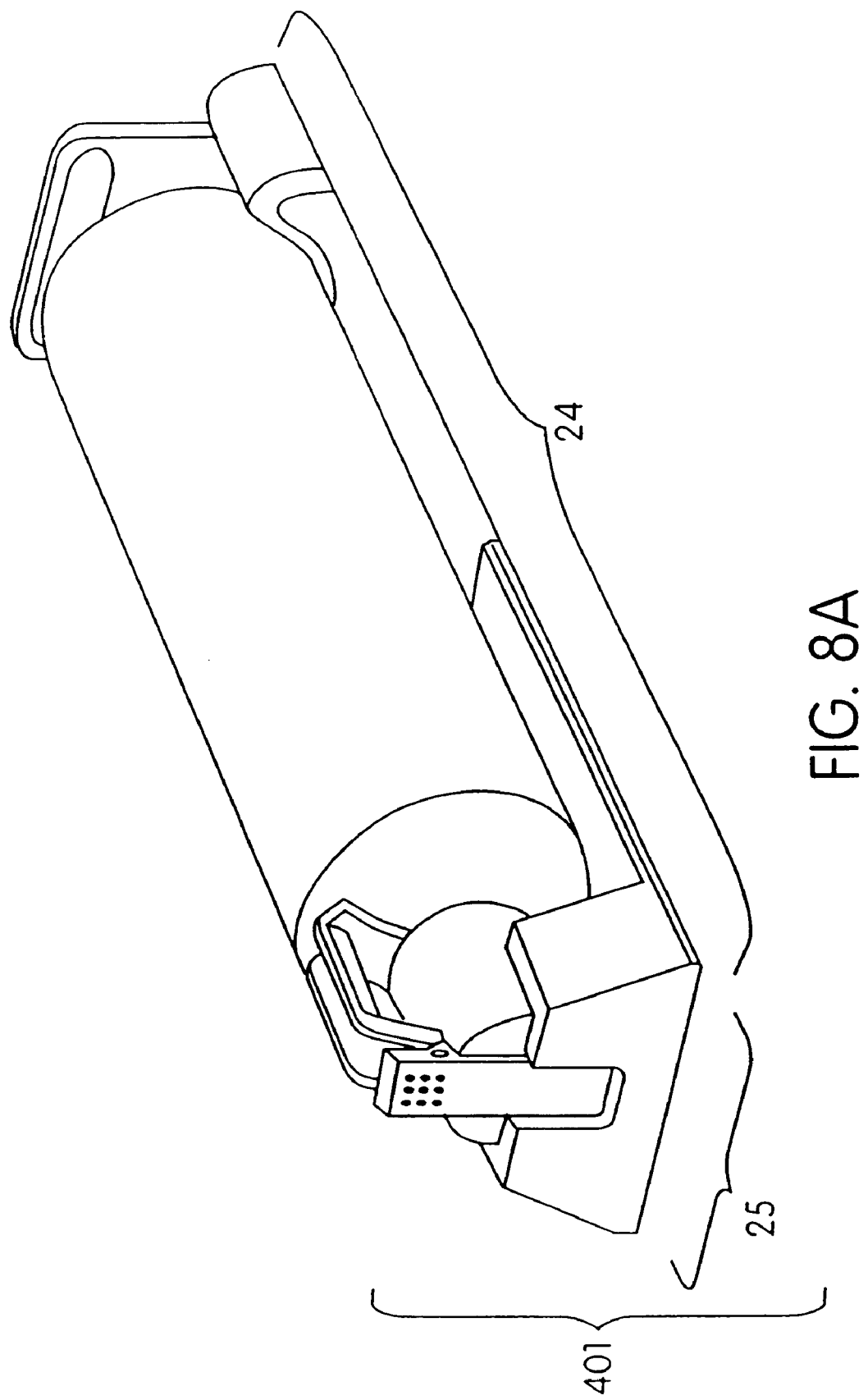
FIGS. 8A–8D show canister assemblies docked with manifold assemblies according to exemplary embodiments.
Figure 8B:
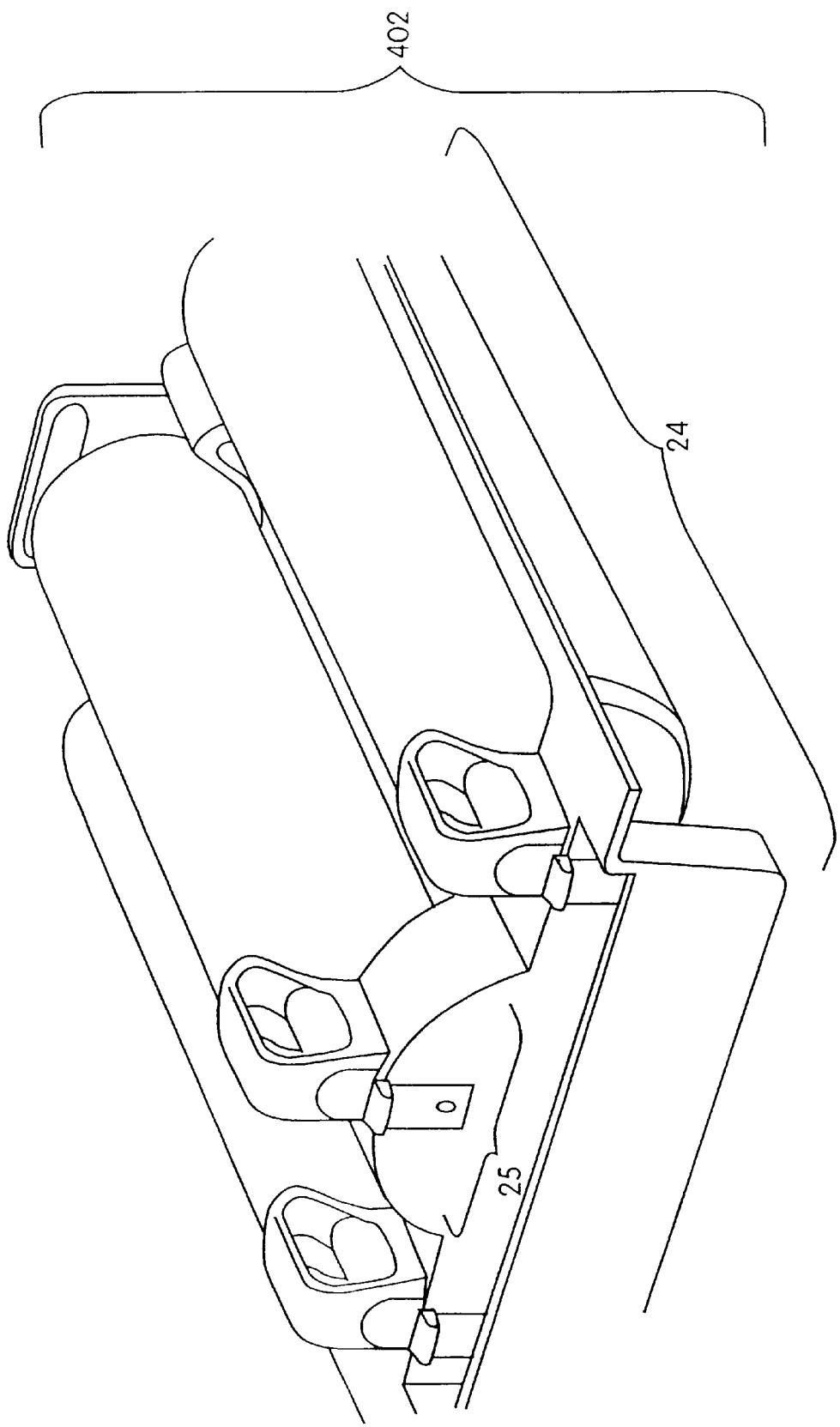
Figure 8C:
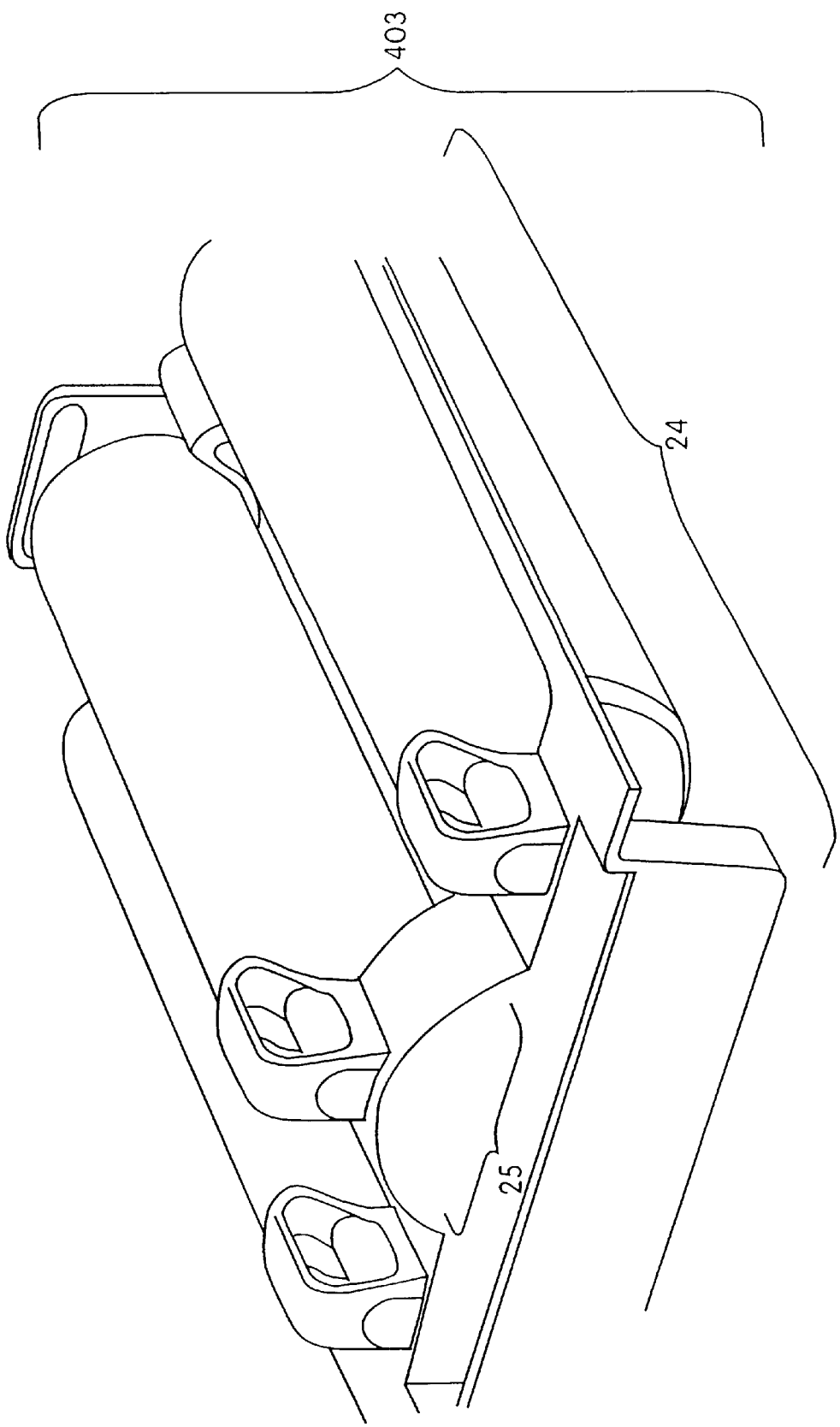
Figure 8D:
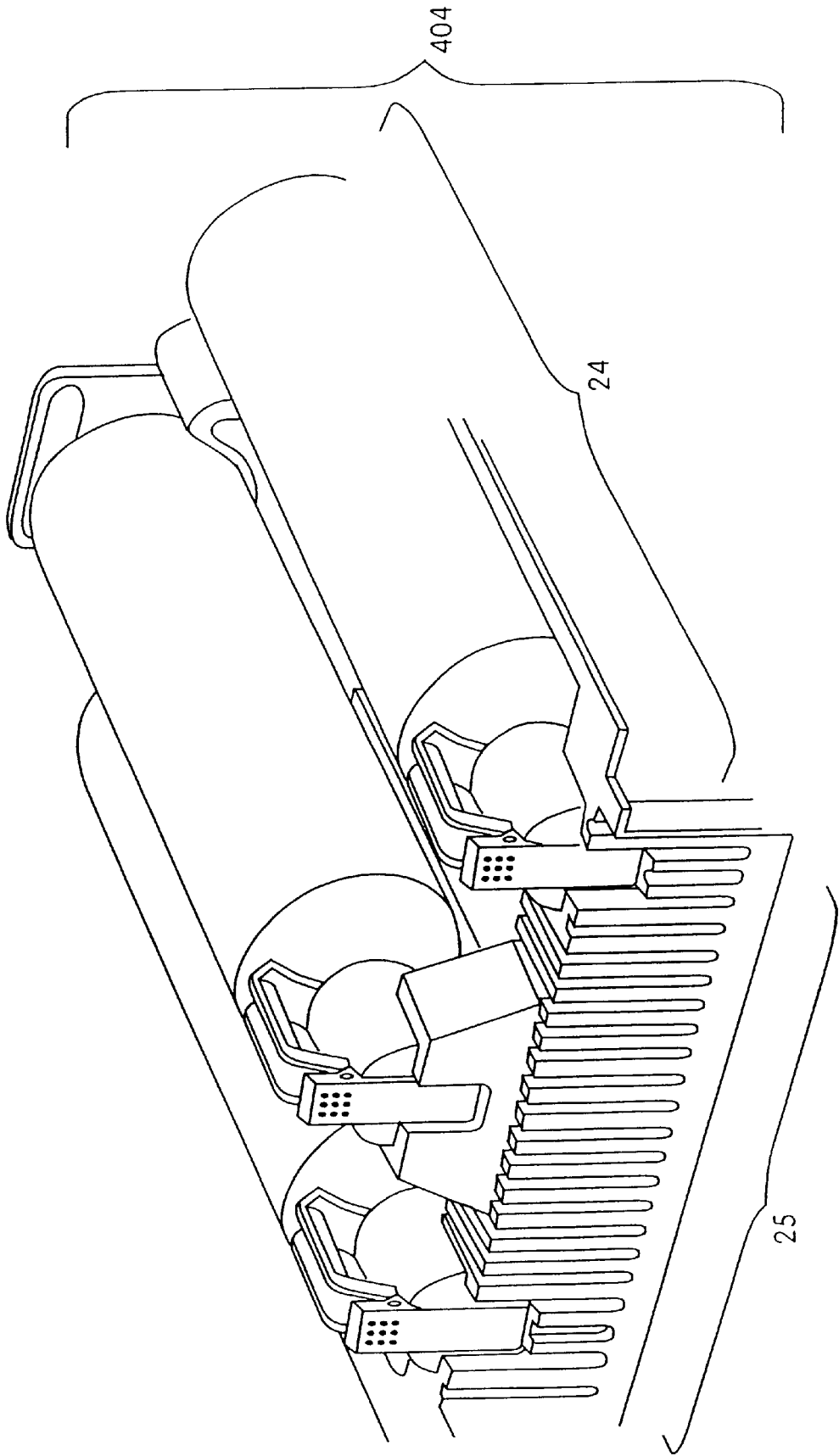

FIGS. 8A–8D show docking assemblies 401–404 of canister assembly 100, 200 to be, for example, interconnected to a manifold assembly 13, 13A, 13B according to exemplary embodiments of the present invention. Canister 1 having plug enclosure 2 and protective handle 7 may rest on a canister bay 24 having a form to easily accept the shape of the canister 1. A protective housing 25, separate from or integral with canister bay 24, may surround the interface of plug enclosure 2 with manifold port 19, 21. Protective housing 25 may be contoured to complement the curvature of the protective handle 7 to minimize room for displacement of the canister assembly or malalignment of the canister/manifold interconnection. Protective housing 25 may include port docking element 12. FIGS. 8A and 8D show docking assemblies 401 and 404 using handle docking element 11A and port docking element 12A as depicted in FIGS. 4A–4C, 4J–4M, 5, and 6, whereas FIG. 8B shows docking assembly 402 using handle docking element 11B and port docking element 12B. FIG. 8C shows docking assembly 403 using handle docking element 11C and port docking element 12C.

FIG. 8A depicts a single metal hydride canister assembly as docketed in canister bay 24. However, additional canisters could be added, as shown in FIGS. 8B–8D, or the physical dimensions of the canisters could be altered to allow for an increase in hydrogen storage capacity of the unit. An easily portable canister size may fuel 1 hour of 1 kW of electricity at 120V. A fuel cell generator using 1 hr/1 kW canisters may easily accommodate three of these canisters without compromising convenience and mobility.

We claim:

1. A docking assembly for a canister assembly and a manifold assembly, the docking assembly comprising:
   a canister assembly including a first locking element;
   a docking station removably supporting the canister assembly, the docking station including a second locking element releasably engaging the first locking element; and
   a manifold assembly releasably connect to the canister assembly as the first and second locking elements engage at the docking station, the manifold assembly comprising:
   a manifold, and
   at least one port attached to the manifold, each port having a check valve and also having a valve interface mechanism coupling to the canister assembly.

2. The docking assembly of claim 1, wherein:
   the valve interface mechanism includes a solenoid valve having a male fitting and being eletrically connected to a control device, the solenoid valve activating a plunger on the male fitting, and the plunger activating the delivery valve mechanism on the plug enclosure.

3. The docking assembly of claim 1, wherein the valve interface mechanism includes a recessed bore on the port and a port-side electrical connection to a control device, wherein the delivery valve mechanism integral to the plug enclosure includes a solenoid valve having a male fitting and a plug-side electrical connection, wherein the port-side electrical connection releasably connects to the plug-side electrical connection of the solenoid valve and activates a plunger on the male fitting, and wherein the plunger of the solenoid valve opens into the recessed bore.

4. The docking assembly of claim 1, wherein the first locking element includes a clip and the second locking element includes a lip, the clip gripping the lip to hold the protective handle relative to the port.

5. A docking assembly for a canister assembly and a manifold assembly, the docking assembly comprising:
   a canister assembly comprising:
      a first locking element;
      a canister having an interior cavity defined by an exterior shell and an opening to the interior cavity, the open delimited by the exterior shell;
      a plug enclosure attached to the canister at the opening, the plug enclosure forming a pressurized seal of the interior cavity;
      a vent mechanism integral to the plug enclosure and in pressure equilibrium with the internal cavity, the vent mechanism automatically reducing a pressure in the canister when pressure inside the canister exceeds a preset level;

a delivery valve mechanism integral to the plug enclosure, the delivery valve mechanism being automatically and remotely controlled; and a protective handle enveloping the plug enclosure and fastened to the canister assembly, the protective handle including the first locking element wherein the first locking element includes a handle docking element;

a docking station removably supporting the canister assembly, the docking station including a second locking element releasably engaging the first locking element; and a manifold assembly releasably connecting to the canister assembly as the first and second locking elements engage at the docking station.

6. The docking assembly of claim 5, wherein the first locking element includes a barb slot and the second locking element includes a barbed latch, the bated latch having a barb projecting at an angle, and whereby the barb fills the barb slot upon the barbed latch returning to a closed position to hold the protective handle relative to the port.

7. The docking assembly of claim 5, wherein the first locking element includes a snap having a flexible tooth with a rounded tip and the second locking element includes a curved hole, and the flexible tooth forces the rounded tip into the curved hole as the rounded tip slides over the curved hole to hold the protective handle relative to the port.

8. A docking assembly for a canister assembly and a manifold assembly, the docking assembly comprising:

a canister assembly including a first locking element;

a docking station removably supporting the canister assembly, the docking station comprising:

a second locking element releasably engaging the first locking element;

a canister bay;

a port docking element formed by the second locking element; and a protective housing at one end of the canister bay and including the port docking element; and a manifold assembly releasably connecting to the canister assembly as the first and second locking elements engage at the docking station.

9. A docking assembly for a canister assembly and a manifold assembly, the docking assembly comprising:

a canister assembly comprising:

a canister;

a first locking element; and a heat transfer/decrepitation device located within the interior cavity of the canister; and a docking station removably supporting the canister assembly, the docking station including a second locking element releasably engaging the first locking element; and a manifold assembly releasably connecting to the canister assembly as the first and second locking elements engage at the docking station.

10. The docking assembly of claim 9, wherein the heat transfer/decrepitation device includes a thermoconductive metal brush, the thermoconductive metal brush centrally placed along the the interior cavity, the thermoconductive metal brush including a stem and bristles, the bristles intertwined with the stem and pointing radially outward toward the exterior shell.

* * * * *

UNITED STATES PATENT AND TRADEMARK OFFICE
CERTIFICATE OF CORRECTION

PATENT NO.    : 6,488,059 B2
DATED         : December 3, 2002
INVENTOR(S)   : Kenneth Frank et al.

It is certified that error appears in the above-identified patent and that said Letters Patent is hereby corrected as shown below:

<u>Column 6,</u>
Line 27, "releasably connect" should read as -- releasably connecting --.
Line 62, "the open" should read as -- the opening --.

<u>Column 7,</u>
Line 21, "the bated latch" should read as -- the barbed latch --.

Signed and Sealed this

Twenty-third Day of March, 2004

JON W. DUDAS
*Acting Director of the United States Patent and Trademark Office*